May 15, 1928.                                  1,669,768
G. C. MARTIN
PROCESS OF TREATING AND FORMING PIPE
Filed Nov. 8, 1926
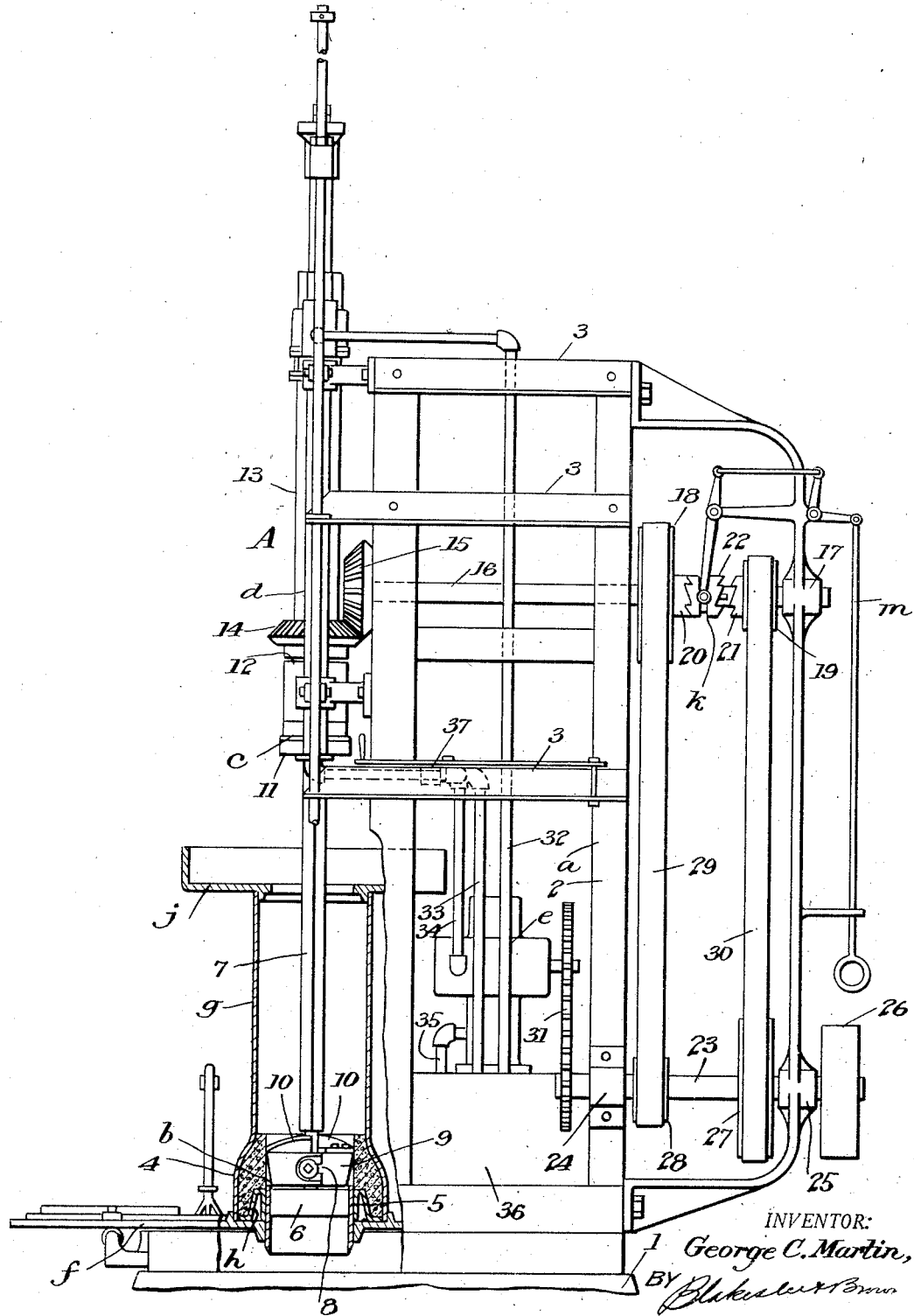
INVENTOR:
George C. Martin,
BY Blakeslee Bros.
ATTORNEYS.

Patented May 15, 1928.

1,669,768

UNITED STATES PATENT OFFICE.

GEORGE C. MARTIN, OF LOS ANGELES, CALIFORNIA.

PROCESS OF TREATING AND FORMING PIPE.

Application filed November 8, 1926. Serial No. 147,039.

This invention relates to a process and means of treating and forming pipe, such as concrete pipe, in such a manner as to provide a pipe which has great resistance to percolation of water or other liquids therethrough.

The invention has for an object the provision of a process and means whereby pipe can be made comparatively water-resisting in a simple and inexpensive manner and within a minimum of time.

In practicing the invention I may provide any form of pipe making machine which utilizes an outer mould, and a member within said mould adapted to act upon the material for making the pipe, which will force the material into pipe form. Preferably, this member consists of a rotary and reciprocal packer head, which will densely pack the pipe making material through both rotation and reciprocation thereof. After the pipe has been formed, I then again lower the packer head within the pipe, and make a second run of said head, and while the said packer head is revolving pour a water-proof material such as asphalt, asphaltum, a water-proof cement or the like upon said packer head. When the water-proof material is cement, the cement preferably contains some mineral water carrying body, such as diatomaceous earth. The packer head will then force in one embodiment of the invention the water-proof material into the surface of the pipe already formed in such a manner as to plaster the inner wall of said pipe. In this connection, it is evident that the packer head, due to its rotation and packing of the pipe making material during the first run or initial making of the pipe, will draw some of the cement in the pipe making material, if said pipe making material is concrete, to the surface of the pipe, and when the second run is made of the packer head with, for instance, the water-proof cement or diatomaceous earth with cement and sand poured thereon, the cement originally drawn to the surface of the pipe will unite with the water-proof cement and sand. This process of forming the pipe must be distinguished from that process of making pipe which is of ordinary practice when diatomaceous earth is used, in this, that by the ordinary practice the diatomaceous earth is mixed throughout the body of the pipe. The diatomaceous earth has four valuable qualities when mixed with concrete: First, it makes the mix adhere to work; second, it promotes a better crystallization of the cement by holding the water in the mix until a thorough cure has taken place; third, it fills the voids and makes a denser mass; and fourth, diatomaceous earth is almost pure silica and is almost inert, and therefore highly resistant to acids and gases. However, if diatomaceous earth is mixed in any quantity with the concrete over a few per cent it weakens the concrete because it of itself has no great strength. With my process, however, I apply some water-proof means such as asphalt, or water-proof cement or cement with diatomaceous earth or other mineral-carrying body, to the inner surface of the pipe which has already been molded out of concrete having the full strength of well mixed sand, rock and cement, and when this asphalt or water-proof cement or cement with diatomaceous earth is troweled within the surface of the pipe it makes the pipe resistant to percolation. It is not of any great importance that this inside plaster bears as great strength as the concrete pipe, and therefore a mix richer in diatomaceous earth may be used than would be possible in the main body of the pipe. Pipe may be made by practice of this process which has all the strength of the best concrete pipe, and still be practically free from percolation of water which may cause it to leak or weaken it. Naturally the second troweling of the concrete pipe makes it denser. It has been found that the addition of diatomaceous earth to cement makes the cement ten times as resistant to percolation of water as ordinary cement.

Other objects of the invention will be detailed as the description thereof proceeds, and as illustrating a means for carrying out the invention I have prepared a drawing in which the figure is a side elevation of a pipe making machine.

Referring now with particularity to the drawing, I may say that the showing thereof has been fully described in my pending application for pipe making machine filed in the United States Patent Office October 26, 1926, Serial No. 144,263. To briefly describe this machine, although other forms of machines are equally adaptable for carrying out the process, I have provided a base or foundation 1 upon which the pipe making machine designated as A is mounted. This machine A includes framework $a$ which has uprights 2 and cross members 3 to properly brace the same, and which framework is so formed as to best carry the pipe making device. In the present instance such pipe making device includes a packer head $b$ adapted to be rotated by means $c$ and likewise elevated or lowered by means $d$ and $e$. The stand 1 is adapted to accommodate a turntable $f$ upon which turntable may be mounted an outer mould $g$ and an inner mould $h$. This outer mould carries at one end a hopper $j$ and the opposite end of said mould is formed with a bell end 4 adapted to cooperate with the inner mould $h$. By turning the turntable $f$ the mould $g$ may be brought into such a position as to receive the packer head $b$. This packer head includes a casing 5 having a cross member 6, which cross member is secured to an end of the shaft 7. Likewise secured to the shaft 7 and above the cross member 6 is a spider 8, to which spider is bolted or otherwise secured a pair of trowelers 9. Secured to the spider 8 and above the trowelers are wings or propellers 10, of which there may be a pair. The shaft 7 is provided with angularly related sides in the present instance, and is passed through suitable bearings 11 and 12 and then received within a cylinder 13, the upper end of said shaft being provided with a piston head. Also mounted on said shaft is a bevel gear 14 which constitutes a part of the means $c$ for rotating the said shaft. This gear 14 is adapted to mesh with a second gear 15 mounted on a shaft 16. This shaft is suitably carried in bearings in the framework, one of which bearings is shown at 17. This shaft is adapted to be rotated at variable speed through the medium of one or the other of two driven pulleys 18 and 19. These pulleys in each instance are loosely mounted upon the shaft 16 and carry plate clutch members 20 and 21. These plate members form two portions of a clutch $k$. The shiftable member 22 of said clutch is keyed to the shaft 16 and suitable means $m$ is provided for moving the shiftable member into engagement with one or the other of the said members 20 and 21. A second shaft 23 is secured in bearings 24 and 25, which shaft carries pulleys 26, 27 and 28. The pulleys 27 and 28 are of large and small diameters respectively, and the pulley of largest diameter is adapted to co-operate with the pulley of small diameter on the shaft 16 and the same is true for the pulleys 18 and 28. Passed over the pulleys are continuous belts 29 and 30 respectively. The pulley 26 is the drive pulley and may be associated with any source of power.

The means $e$ includes a pump which is driven from the shaft 23 as shown at 31, and suitable piping 32, 33, 34 and 35 communicates with a source of liquid supply 36 and with the top and bottom portions of the cylinder 13. Valve means 37 controls the passage of the fluid in such a manner that the fluid will elevate the piston to raise the shaft 7 when the valve is in one position, and when the valve is in a second position allow an exhaustion of the fluid below the piston to lower the said shaft 7.

In utilizing the device as just described, I first lower the packer head to the position as shown in the figure, and concrete is then placed upon the hopper, the packer head is rotated at a slow speed until the bell end of the mould is properly filled, after which the clutch is shifted to rotate the packer head at a higher speed and draw a little cement to the inner surface of the concrete. The shaft 7 is then elevated while the packer head is rotated at a high speed with the continual application of concrete, so that a pipe is formed. The packer head while still rotating is then lowered within the formed pipe and some mineral water carrying body such as diatomaceous earth, or any standard waterproof cement, or any suitable waterproofing materials such as asphalt or the like, plus a cement is then placed within the formed pipe and upon the packer head, and the packer head acts upon the hot bituminous material to plaster this material against the inner surface of the pipe. Quite obviously, the cementitious product of the diatomaceous earth and the cement, plus the cement already drawn to the surface of the formed pipe, will unite or adhere by reason of the pressure exerted by the packer head upon such materials. The result will be a pipe in which the inner surface will greatly resist the percolation of water or other liquids. The inventor has found that whereas a concrete pipe may be tested for breaking pressures when new, yet after said pipe has been placed in the ground and used, that liquids will seep through the pipe and greatly reduce its strength. The present method, however, prevents this loss of strength in the pipe. Quite obviously, the outer surface of the pipe might be treated, if desired.

It is obvious that various changes and modifications and variations may be made in carrying out the process and means of forming the pipe as just detailed without departing from the true spirit of the invention.

Having thus disclosed my invention, I claim and desire to secure by Letters Patent:

1. The process of making waterproofed molded pipe which consists in subjecting a wet mixture of cement to trowelling pressure from the inside of the mold toward the outside thereof thereby densely to pack the same and cause the cement of the mixture to be brought to the inner surface of the pipe, and then applying by trowelling pressure a waterproofing material to the inner surface of the pipe thereby pressing the same into the cement brought to the surface by the original trowelling pressure.

2. The process of forming pipe, which consists in first subjecting a moldable substance to trowelling pressure to mold it into pipe form, then before the moldable substance hardens applying a waterproofing material on to a surface thereof and working the same into said body by trowelling pressure.

In testimony whereof, I have signed my name to this specification.

GEORGE C. MARTIN.